United States Patent [19]

Fujimura

[11] 4,097,807
[45] Jun. 27, 1978

[54] AUTOMATIC EQUALIZING METHOD AND SYSTEM

[75] Inventor: Noriaki Fujimura, Tokyo, Japan
[73] Assignee: Fujitsu Limited, Kawasaki, Japan
[21] Appl. No.: 644,507
[22] Filed: Dec. 29, 1975

[30] Foreign Application Priority Data

Dec. 27, 1974 Japan ................................. 50-1303

[51] Int. Cl.² ............................................ H04I 27/18
[52] U.S. Cl. ....................................... 325/42; 325/323
[58] Field of Search ............... 325/42, 323; 333/18 R; 178/88

[56] References Cited

U.S. PATENT DOCUMENTS

| | | | |
|---|---|---|---|
| 3,736,414 | 5/1973 | McAuliffe | 325/42 X |
| 3,875,515 | 4/1975 | Stuart | 325/42 X |
| 3,890,572 | 6/1975 | Desblanche | 325/42 |
| 3,921,072 | 11/1975 | Sato | 325/42 |
| 4,028,626 | 6/1977 | Motley | 325/42 |

Primary Examiner—Harold I. Pitts
Attorney, Agent, or Firm—Staas & Halsey

[57] ABSTRACT

Apparatus and method for use in a suppressed carrier data transmission system for automatically compensating for static and dynamic variations in the phase and amplitude characteristics of the transmission channel, including the phase variations of the locally-generated carrier signal, to minimize distortion of the data signals. A transversal filter receives and filters the baseband data signal and the thus filtered data signal is compensated for its dynamic distortion by a compensation network. A decision circuit generates an output code group for each successive data period and an error signal is derived therefrom. The error signal is separated into a steady state component and a dynamic component; the steady state component utilized to control the transversal filter tap gain to minimize such component, and the dynamic component utilized to control the compensating network to minimize such component. The invention is implemented as an analog circuit and, additionally, as a digital processing circuit.

19 Claims, 5 Drawing Figures

AUTOMATIC EQUALIZING METHOD AND SYSTEM

BACKGROUND OF THE INVENTION

1. Field of the Invention

The present invention relates to a transversal-type equalizing apparatus and method for use in a suppressed carrier data transmission system, and more specifically to apparatus and method that automatically compensates for phase pertubations in the reinserted carrier signal at the receiving terminal of such system as well as for variations in phase and amplitude of the received signal due to the transmission channel.

2. Description of the Prior Art

The demands for data transmission have greatly increased in recent years, resulting in development of techniques for transmission of high-rate pulse-type data signals over bandlimited transmission channels such as telephone lines and the like. Additionally, demands are also placed on greater accuracies in detection of such data signals at the receiving terminal.

Two significant factors influencing the capability of a data communication system to correctly receive the transmitted signals are: (1) the noise characteristics of the transmission channel, and (2) the intersymbol interference caused by the time dispersion in the channel. For low-noise environments, as typified by telephone channels, the most important consideration is minimization of the latter factor.

For a given telephone channel, the transfer function of the channel is characterized by its attenuation and delay as a function of frequency. The envelope delay, defined as the derivative of the phase characteristic, represents the relative time of arrival of the various frequency components of the input signal; thus, a sequence of pulses, or symbols, in passing through the channel are distorted and overlap in time between successive symbols. This distortion is referred to above as intersymbol interference.

While the above-mentioned channel characteristics may be relatively constant for a specific telephone line, in switched telephone networks a channel is generally chosen at random for a given transmission; therefore a wide variation of channel characteristics may be expected with respect to a given receiving terminal. To solve this problem, it is well-known to provide at the receiving terminal an automatic equalizer having the capability to compensate for the expected range of attenuation and phase variations of the incoming channels, thus minimizing intersymbol interference in the received data.

The most effective prior art equalizer is the transversal filter wherein a delay line tapped at intervals equal to the symbol period has each tap connected through a variable gain element to a summing bus. The gain elements are automatically controlled by means of an error signal to introduce echoes of the signal of such amplitudes as to compensate for the overall channel delay characteristics.

The requirements for higher data rates have led to development of multi-level modulation methods (e.g., multiphase and quadrature amplitude modulation methods) to increase the data rate in a given channel bandwidth. As is well known, it is common to translate the baseband data signal to a higher carrier frequency, and to frequency multiplex a number of such frequency-translated signals over a single wide-band channel. Generally, the carrier frequency is suppressed and only the upper and lower sidebands are transmitted, this method being known as double sideband, suppressed carrier (DSBSC) transmission. Therefore, the pilot signal is not required. This makes unnecessary the use of complicated carrier regeneration circuit which inevitably was required for regenerating the pilot signal. Moreover, since there is no need to allocate within the bandwidth available for transmission the pilot signal adjacent to the data signal, a comparatively simplified filter circuit can be used. This is a large merit of such a transmission system.

At the receiving terminal, however, it is necessary to regenerate the carrier frequency and to insert the carrier at the correct phase in order to demodulate the data signal and thereby recover the baseband signal. The requirement for locally generating the carrier for demodulating the DSBSC signal gives rise to an additional source of signal distortion. Unavoidable variations in generation of the carrier may result in frequency offset and phase jitter. Prior art automatic equalizers of the transversal type have attempted to solve this second distortion problem by two basic compensating, or correcting, techniques. The first is to use a local carrier generator or of fixed frequency, and to rely on the normal automatic adjustment of tap gains of the equalizer to correct for carrier frequency deviation and phase jitter. The second is to use a voltage controlled local carrier-generating oscillator and to control same as a function of the error signal of the automatic equilizer.

Such compensating methods have the disadvantage that high channel equalizing accuracy requires a relatively large number of delay line taps, and the response time of the filter increases with the number of taps; yet, the response time must be short if the system is to be able to follow the rapid carrier phase jitter. Therefore, a satisfactory compromise between equalizing accuracy and phase jitter compensation is difficult or not possible — i.e., increasing equalizer accuracy increases jitter, and decreasing jitter results in decreased accuracy.

SUMMARY OF THE INVENTION

The present invention overcomes the disadvantages of the prior art by providing means, used in combination with an automatic equalizer, for automatically compensating for variations in phase of the locally-generated carrier in a DSBSC data transmission receiving terminal without affecting the equalizing accuracy of the automatic equalizer with respect to the data channel amplitude and phase characteristics. Hence, the present invention provides an automatic equalizing method and system which can effectively compensate, or correct the phase of the carrier without deterioration of the equalizing accuracy of the automatic equalizing circuit.

One embodiment of the invention involves modifying the signal appearing on the transversal filter summing bus in accordance with a characterization of the error signal caused only by the carrier phase pertubations. The modified sum signal is then applied to the decision circuitry and a composite error signal derived conventionally. The composite error signal is next processed to remove the carrier phase pertubation error signal and thus to provide a gain control signal that is relatively free from the effects of the phase variations. The resultant gain control signal is used to control the tap gain circuits of the transversal filter.

It is therefore a primary object of the present invention to provide apparatus and method for automatically compensating for distortion in received data symbols caused by phase pertubations in the re-inserted carrier of a DSBSC data transmisison receiving terminal.

It is a further object of the present invention to provide apparatus for and a method of compensating for carrier phase pertubations without affecting the accuracy of the automatic compensation for variations in the data transmission channel amplitude and phase characteristics.

It is another object of the present invention to provide an automatic equalizing apparatus and method that will closely track phase variations of the locally generated carrier signal.

It is yet another object of the present invention to provide an automatic equalizing apparatus in which variations in phase of the locally-generated carrier signal are compensated through the use of digital circuitry.

These and other objects and advantages of the present invention will become apparent to one skilled in the art to which the invention pertains from a perusal of the appended claims and the detailed description when read in conjunction with the attached drawings.

DETAILED DESCRIPTION OF THE INVENTION

Before describing embodiments of the present invention, it is helpful to analyze the prior art automatic equalizer of the transversal-filter type as applied to a DSBSC data communication system. Accordingly, in FIG. 1, a typical prior art automatic equalizer is shown. Input terminal 1 of demodulation circuit 2 receives the DSBSC signal. Demodulator 2 includes a local oscillator 2a which generates the demodulation signal $\theta c$ of the required carrier frequency, applied to multiplier 2b. The DSBSC signal is then multiplied by multiplier 2b with signal $\theta c$ producing a baseband signal at the output of the demodulator 2. A low-pass filter, although not shown, is assumed to be (and typically is) included in demodulator 2 to pass only the fundamental baseband frequencies to the output.

Figure 1:
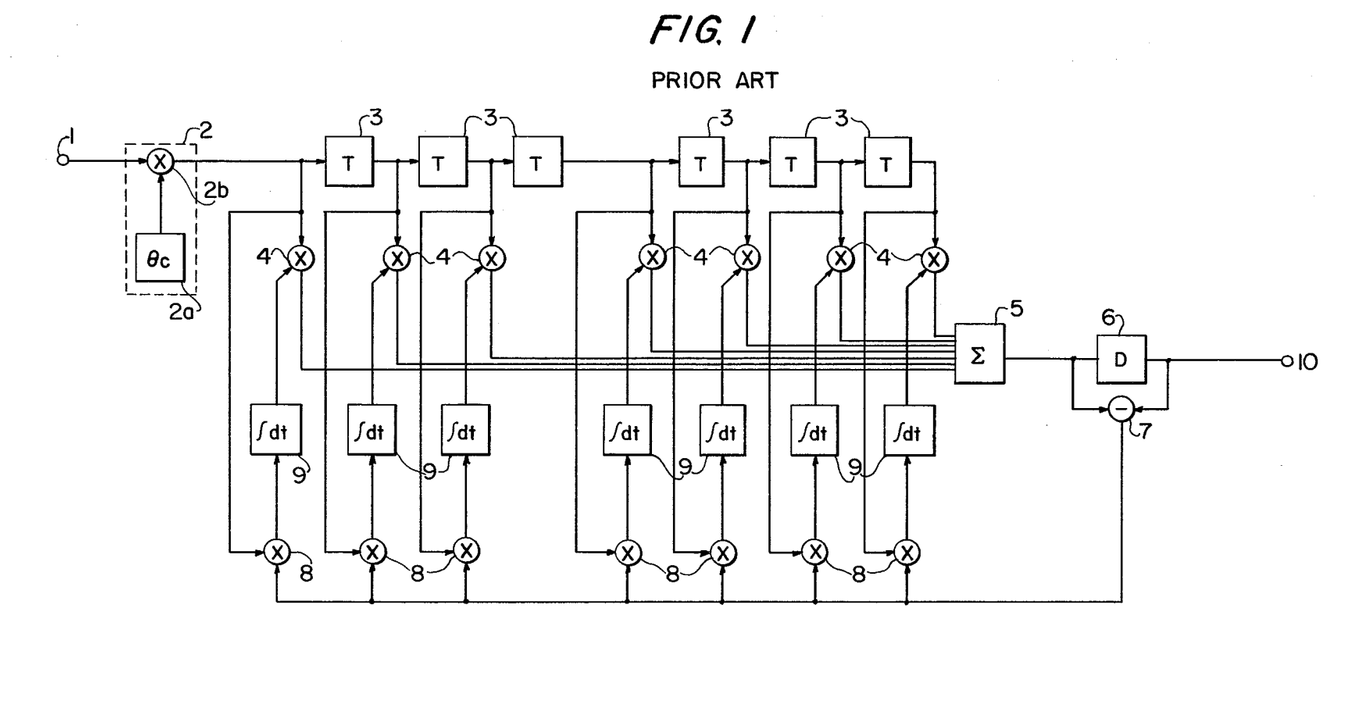
FIG. 1 is a block diagram of a conventional prior art automatic equalizing circuit of the transversal-filter type presented to delineate the operating principles thereof.

As will be recognized, the baseband signal can include distortion from the following sources:

1. the amplitude vs. frequency characteristic of the transmission channel is not a constant;
2. the phase vs. frequency characteristic of the transmission channel is not linear with frequency;
3. pertubations in the phase of carrier $\theta c$.

The baseband signal is passed through a series of delay circuits 3 in the delay interval of each of which is selected to be equal to the data symbol duration. A tap at each delay circuit 3 supplies the signal from each delay 3 through a corresponding variable tap gain circuit 4, the outputs of all circuits 4 being supplied to summing circuit 5. The summed signal at the output of summer 5 is thus the baseband signal modified by weighted and delayed versions, or sample portions of the signal. By properly adjusting each tap gain circuit 4, the distortions of the baseband signal can be minimized, within the inherent capabilities of the equalizer.

The summed signal is accordingly analyzed by decision circuit 6 which judges and regenerates the data signal, based on a prior knowledge of the total ensemble of possible signals, as to the correct signal (typically by a thresholding operation) which then appears as the digital output at output terminal 10. Difference circuit 7 substracts the output signal of summer 5 from the digital output signal of the decision circuit 6, with the difference thus representing the residual distortion, or error, signal. The error signal is utilized in a negative feedback fashion to modify the transfer characteristics of the transversal filter to cause the summed signal from summer 5 to more nearly approximate the digital output signal of decision circuit 6, thereby reducing the error signal. Accordingly, the error signal is multiplied by multipliers 8 respectively associated with the taps, the products therefrom being smoothed or averaged by associated integrators 9, and the outputs of the latter then are utilized as gain control signals for the corresponding tap gain circuits 4. It is to be noted that the signals present at each multiplication and summing point are considered to be complex, varying in both amplitude and phase.

Having briefly summarized the operation of the prior art circuit of FIG. 1, an analysis will be described to illustrate the operation of the circuit and the problems of such a circuit to which the present invention is directed.

Case (1) Static channel characteristics:

The baseband input signal to the delay circuit is expressed as $x(t)$ and is assumed to have the form $$x(t) = \sum_{K=-\infty}^{\infty} a(K) \cdot h_1(t - KT) \tag{1}$$

where:

$a(K)$ is the code transmitted over the channel;
$h_1(t)$ is the impulse response of the equalizer input; and
$T$ is the symbol or pulse duration of the code.

The automatic equalizer output, $y(t)$, can be expressed as:

$$y(t) = \sum_{K=-\infty}^{\infty} a(K) \cdot h_2(t - KT) \tag{2}$$

where: $h_2(t)$ is the impulse response of the equalizer, and is given by:

$$h_2(t) = \sum_{n=-M}^{N} C_n \cdot h_1(t - nT) \tag{3}$$

where:

$M$ is the number of taps before the center tap,
$N$ is the number of taps after the center tap, and $C_n$ is the tap gain coefficient.

The relation between $x(t)$ and $y(t)$ can be expressed as:

$$y(t) = \sum_{n=-M}^{N} C_n \cdot x(t - nT), \quad (4)$$

and the equalizing output after sampling becomes:

$$h(\tau, T) = \sum_{n=-M}^{N} C_n \cdot h_1\{(\tau - n)T\} \quad (5)$$

Referring to the output of the decision circuit 6 as $a(\tau)$, the error $\epsilon(\tau)$, comprising the difference between the equalizer output and the decision circuit output and hereinafter referred to as the "equalizing error," is seen to be $$\epsilon(\tau) = y(\tau, T) - a(\tau). \quad (6)$$

The automatic equalizing circuit is adjusted by an algorithm that determines the correlation of the input signal $x(t)$ and the equalizing error $\epsilon(\tau)$ to compensate the tap coefficient $C_K$, as expressed by the following equation:

$$C_K^{(n+1)} = C_K^{(n)} - a_c \cdot \epsilon(\tau) \cdot x\{(\tau - K)T\} \quad (7)$$

Where $a_c$ is the control coefficient, and $C_K^{(n)}$ is the gain value of the Kth tap adjusted by $n$ times.

Assume that the optimum $C_K$ has been obtained by minimization of the mean-square (MS) distortion and is $C_{OK}$; then, the root mean-square error defined by the following equation becomes a minimum when $C_K = C_{OK}$:

$$\sigma^2_{min} = \sum_{\substack{K=-\infty \\ K \neq 0}}^{\infty} \{h_2(KT)^2\} = \quad (8)$$

$$\sum_{\substack{K=-\infty \\ K \neq 0}}^{\infty} \left[ \sum_{n=-M}^{N} C_{on} \cdot h_1\{(K - n)T\} \right]$$

Case (2) Dynamic channel characteristics:

The general case for which the channel amplitude and phase characteristics vary with time, as will occur due to jitter in the locally-generated carrier, will be considered with the input signal to the automatic equalizer being designated as $x'(t)$. $x'(t)$ may be expressed as:

$$x'(t) = x(t)e^{\gamma(t)} \quad (9)$$

where:

$\gamma(t) = \alpha(t) + i\beta(t)$ and
$\alpha(t) = $ time variation of amplitude and
$\beta(t) = $ time variation of phase (including phase jitter and any frequency offset).

The output $y'(t)$ of the transversal filter may be expressed as $$y'(t) = \sum_{n=-M}^{N} C_n \cdot x'(t - nT) = \quad (10)$$

$$\sum_{n=-M}^{N} C_n \cdot x(t - nT)e^{\gamma(t-nT)}$$

If the total delay time, $(M+N)T$, through the automatic equalizing circuit is much smaller than the dynamic channel variation rate, the value of $e^{\gamma(t-nT)}$ will appear to be a constant for $n = -M$ through N, which may be expressed as $e^{\gamma(t)}$.

In this case, the expression for channel variation reduces to $$y'(t) = \left\{ \sum_{n=-M}^{N} C_n \cdot x(t - nT) \right\} e^{\gamma(t)} = x(t)e^{\gamma(t)} \quad (11)$$

The sampled equalizing error $\epsilon'(\tau)$ now may be expressed as:

$$\epsilon'(\tau) = y'(\tau, T) - a(\tau)$$

$$= y(\tau, T)e^{\gamma(\tau, T)} - a(\tau). \quad (12)$$

In order to minimize the inter symbol interference, the following expression must be optimized:

$$\sigma^2 = \sum_{K \neq 0} \left[ \sum_{n=-M}^{N} C_n \cdot h_1\{(K - n)T\} \right]^2 = \quad (13)$$

$$\sum_{k \neq 0} \left[ \sum_{n=-M}^{N} C_n \cdot h\{(K - n)T\}e^{\gamma(t)} \right]^2$$

For this expression to become a minimum in accordance with equation (8), the following relation must obtain:

$$C_n' = C_{on} \cdot e^{-\gamma(t)} \quad (14)$$

In other words, $C_n'$ must follow or track the channel fluctuation $e^{-\gamma(t)}$.

Thus, the fundamental problem in the prior art transversal-filter type automatic equalizer can be now seen. Increasing the speed of response of the filter by reducing the number of delay line taps to allow $C_n'$ to track the channel fluctuation $e^{-\gamma(t)}$ results in decreased accuracy of equalization of the static channel characteristics; and in general, the equalizer cannot be optimized for both types of compensation. Furthermore, when the carrier includes a frequency offset, $e^{-\gamma(t)}$ exhibits a linear increase of phase, and prior art circuits do not have sufficient control to track such error.

Figure 2:
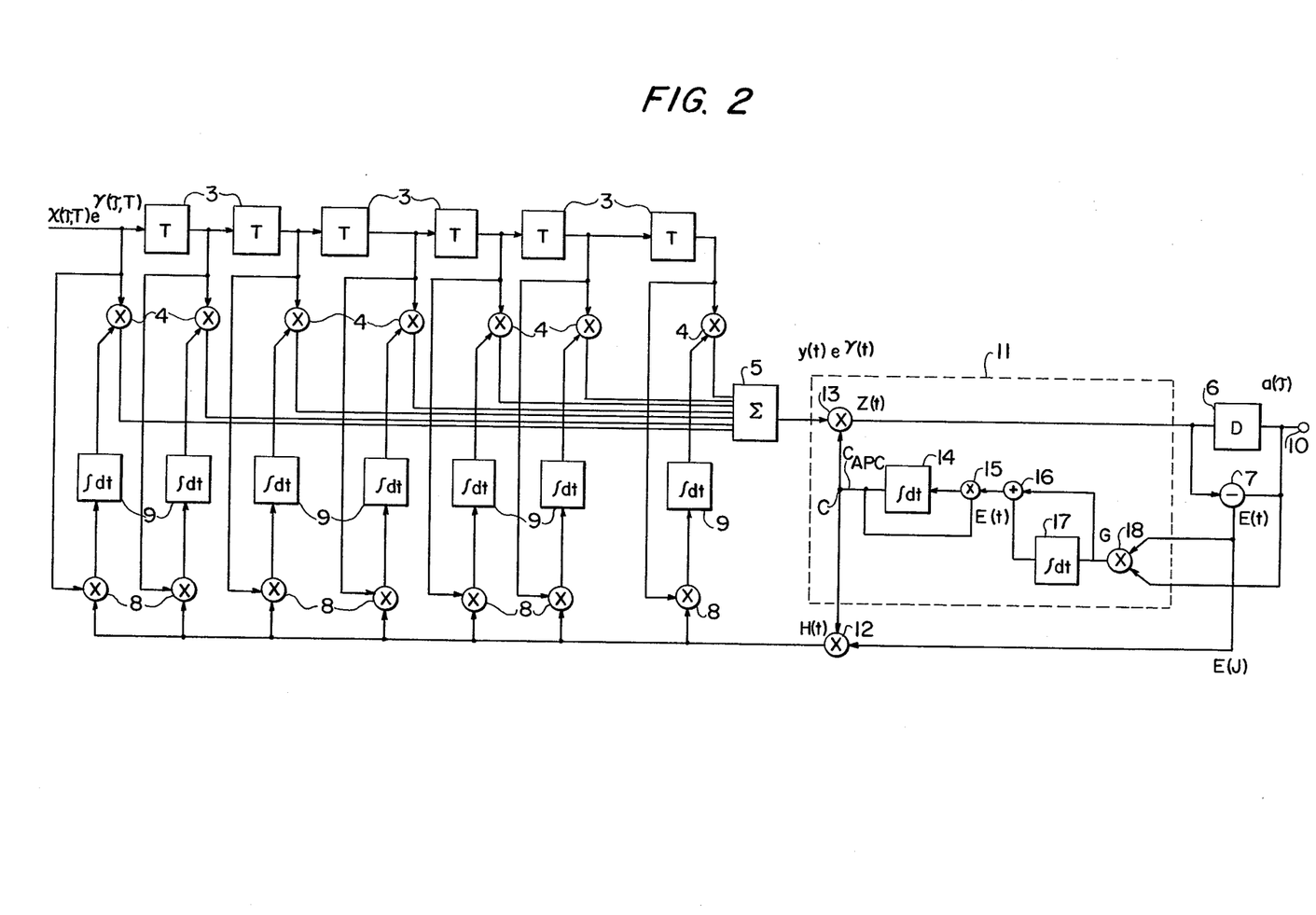
FIG. 2 is a block diagram of one embodiment of an automatic equalizing circuit in accordance with the present invention.

Turning now to FIG. 2, the block diagram of a preferred embodiment of the present invention is shown. Elements in FIG. 2 that correspond to the identical elements in FIG. 1 are identified by the same numbers. As may be noted, the identical prior art transversal-filter type automatic equalizer section of FIG. 1 is included in the instant invention in combination with a phase compensating network 11 and an equalizing error compensation multiplier 12.

Compensating network 11 is connected at the output of the transversal-filter and serves to compensate for phase jitter of the channel characteristic independently of the static characteristic as will be explained in detail hereinbelow. The equalizing error compensation multiplier 12 is connected in the tap-gain control feedback line and is utilized to prevent the phase jitter error component in the equalizing error signal from affecting the static compensation of the equalizer.

The Signal $y''(t)$ at the output of summer 5 may be conveniently expressed in terms of the sampled output of decision circuit 6 and the equalizing error signal as follows:

$$y''(t) = \{a(\tau, T) + \epsilon(\tau)\} e^{\gamma(t)} \quad (15)$$

ϵ(t) as defined in equation (6) represents the equalizing error for the static channel characteristics and will hereinafter be referred to as the steady state error.

At point C in network 11, signal $C_{APC}$ appears as will be shown hereinbelow and approaches $e^{-\gamma(t)}$ with an error of $\Delta(t)$. This residual error, $\Delta(t)$ will hereinafter be referred to as the dynamic error. With this notation, the value of $C_{APC}$ may be expressed as $$C_{APC} = e^{-\gamma(t) + \Delta(t)} \qquad (16)$$

The value $C_{APC}$ is applied to multiplication circuit 13 with the product of $y''(t)$ and $C_{APC}$ designated as $z(t)$, which has the form $$z(t) = y''(t) \cdot C_{APC}$$
$$= \{a(\tau,T) + \epsilon(\tau)\} e^{\Delta(t)}$$
$$\approx a(\tau,T) + \epsilon(\tau) + a(\tau,T)\Delta(t) + \epsilon(-\tau)\Delta(t). \qquad (17)$$

As may now be seen from equation (17), $z(t)$ is the decision circuit output term $a(\tau,T)$ plus a residual error involving the steady state error $\epsilon(t)$ and the dynamic error $\Delta(t)$ and represents the input to decision circuit 6. As is well known, a digital decision circuit generates a discrete output for all input levels lying within a set of limits, effectively determining within which set of limits the analog signal lies. Therefore, the residual error of Equation (17) need be only sufficiently small so that the vector $y''(t)$ lies within the limits which define its correct digital value. Since $\Delta(t)$, the dynamic error, can be made to approach zero as shown hereinbelow, the circuit can thus be compensated for the source of this error.

The manner in which the instant invention extracts or compensates for the dynamic channel variations at the output of summer 5 will now be explained. Assuming that the sampled output of decision circuit 6 is $a(\tau,T)$, the overall equalized error signal $E(t)$ at the output of difference circuit 7 may be expressed as follows:

$$E(t) = z(t) - a(\tau,T)$$
$$= \epsilon(\tau) + a(\tau,T)\Delta(t) + \epsilon(\tau)\Delta(t)$$
$$\approx \epsilon(t) + a(\tau,T)\Delta(t), \text{ where } \epsilon(t) << 1. \qquad (18)$$

Multiplication circuit 18 receives the output $a(\tau,T)$ from decision circuit 6 and the output $E(t)$ of difference circuit 7, with the output at point G then expressed as $$E_a(t) = E(t)a^*(\tau,T)$$
$$= \epsilon(t)a^*(\tau,T) + [a(\tau,T)]^2 \Delta(t) \qquad (19)$$

where $a^*(\tau,T)$ is the complex conjugate of $a(\tau,T)$.

The first term in equation (19) corresponds to the steady state error, and the second term corresponds to the dynamic error. Thus, the first term will become zero when averaged, leaving only a contribution from the second term. $E_a(t)$ is integrated by integrator 17 and added in summer 16 with the output of integrator 17 to produce the sum, $E_b(t)$:

$$E_b(t) = a E_a(t) + b \int E_a(t) dt \qquad (20)$$

where $a$ and $b$ are coefficients determined by the parameters of circuits 17 and 16.

Next, $E_b(t)$ is multiplied in multiplier 15 by the signal at point C, namely, $C_{APC}$, with the product representing an input to integrator 14. Thus, the output of integrator 14 is signal $C_{APC}$ as a function of time and may be expressed as $$C_{APC}(t) = \int C_{APC} E_b(t) dt. \qquad (21)$$

Assume the period between times $t_1$ and $t_2$ is short, with the value of $C_{APC}(t)$ during this interval expressed as $C'_{APC}$, wherein $$C_{APC} = \int_{t_2}^{t_1} C_{APC} E_b(t) dt \qquad (22)$$

As expressed in equation (16) above, $C_{APC}$ is $e^{-\gamma(t) + \Delta t}$, and the following relation can be obtained:

$$C_{APC} = \int_{t_1}^{t_2} e^{-\gamma(t) + \Delta(t)} \cdot E_b(t) dt. \qquad (23)$$

Assuming that in the short period $t_1$ through $t_2$, $\Delta(t) << 1$ and the variation of $-\gamma(t)$ is small, $C'_{APC}$ then becomes $$C'_{APC} \doteq e^{-\gamma(t_1)} \int_{t_1}^{t_2} E_b(t) dt = \qquad (24)$$
$$e^{-\gamma(t_1)} \left[ \int_{t_1}^{t_2} (aE_a(t) + b \int E_a(t) dt) dt \right]$$

Thus, at $t_2$ the value of $C_{APC}(t)$ becomes $$C_{APC}^{(t_2)} = C_{APC}^{(t_1)} + C'_{APC} = \qquad (25)$$
$$e^{-\gamma(t_1)} \left[ 1 + \Delta(t_1) + \int_{t_1}^{t_2} (aE_a(t) + b \int E_b(t) dt) dt \right]$$

and compensation for the error $(t_1)$ can be provided by selecting the proper value for the signal expressed by the term $$\int_{t_1}^{t_2} (aE_a(t) + b \int E_b(t) dt) dt.$$

In other words, the signal at point G in network 11, $E_a(t)$ is operated on by the second order averaging circuit formed by integrators 14 and 17, with the characteristics of such circuit expressed in operational form by a Laplace conversion as $$(a + \frac{b}{S}) \frac{1}{S}.$$

Thus, when $E_a(t)$ is averaged as mentioned above with reference to equation (19), the first term in $E_a(t)$, which is steady state error as shown in Equation (19) becomes zero, leaving $E_a(t)$ equivalent to $\Delta(t)$, thereby effectively adjusting $\Delta(t)$ which then approaches zero.

It now remains to be shown that the compensation of the steady state error remains effective independently of the dynamic compensation in accordance with the present invention. As may be noted, the steady state compensation is controlled by the output signal of multiplier 12, considered to be H(t), which is, of course, the product of E(t) and $C_{APC}$. Considering $\gamma(t)$ and $C_{APC}$ as complex members, H(t) can be expressed as $$H(t) = E(t) \cdot C_{APC}(t)$$
$$= [\epsilon(t) + a(\tau,T)\Delta(t)]e^{\gamma(t) - \Delta(t)}$$
$$= \epsilon(t) \cdot e^{\gamma(t)} + a(\tau,T) \cdot \Delta(t)e^{\gamma(t)} - \Delta(t) \cdot \epsilon(t) - a(\tau,T) \cdot \Delta^2(t)$$
$$= \epsilon(t) \cdot e^{\gamma(t)} + a(\tau,T) \cdot \Delta(t) \cdot e^{\gamma(t)} \quad (26)$$

Signal H(t) represents the residual equalized error signal, made input to multipliers 8. Assuming that $I_K(t)$ is the output of the Kth multiplier, this term can be expressed as $$I_K(t) = H(t) \cdot X^* \{(\tau-K)T\}$$
$$= H(t) \cdot X^* \}(\tau-K)T\} e^{-\gamma(t)}$$
$$= \epsilon(t) \cdot X^* \{(\tau-K)T\} + a(\tau,T) \cdot \Delta t \cdot X^* \{(\tau-K)T\} \quad (27)$$

Averaging $I_K(t)$ by an integrator 9, the required compensation of $C_K$ can be determined:

$$C_K^{(n+1)} = C_K^{(n)} - \alpha_1 [\epsilon(\tau) \cdot X^* \{(\tau-K)T\} + a(\tau,T)\Delta(t-) \cdot X^* \{(\tau-K)T\}] \quad (28)$$

Comparing equation (28) for the tap gain coefficient in accordance with the present invention, with equation (7) for the prior art automatic equalizer shows that the first term in the brackets [] of equation (28) is the same as that of equation (7).

Therefore, assuming proper adjustment of $C_{APC}$ the second term becomes very small, and $C_K$ is optimized with respect to the steady state error.

Accordingly, it is demonstrated that the automatic equalizer implementation of the present invention compensates for the steady state characteristics of the channel in the presence of phase jitter with essentially no effect from such jitter.

The features and advantages of the present invention can be summarized as follows:

1. There is no necessity for the tap gain coefficient $C_K$ to follow the dynamic channel variations as in prior art equalizers. As indicated by equation (15) the dynamic channel variations $e^{\gamma(t)}$ may be superimposed on the transversal filter output. Since it is only necessary for $C_K$ to track such dynamic variations, it is sufficient for the transversal filter to compensate only for the steady state distortion, and the accuracy of the equalizer can be maintained or raised without regard to maintaining high response speed for adjustment of $C_K$.

2. Optimum adjustment of $C_K$ can be made with respect to static channel characteristics without being essentially affected by the dynamic characteristics $e^{\gamma(t)}$ as shown by equation (28) for $C_K$, since $e^{\gamma(t)}$ does not appear therein. A small term involving the residual dynamic error does appear but its effect is negligible when $C_{APC}$ is properly adjusted.

3. Adjustment of $C_{APC}$ can be accomplished essentially independently of the adjustment of $C_K$. Therefore, the speed of response of the phase correction network 11 can be made as high as necessary to track the dynamic variation of the channel characteristics without affecting the static compensation as is desired.

The embodiment of the present invention presented hereinabove has utilized an automatic equalizing circuit using the minimum mean square criteria in which the tap gain is controlled by the equalized residual signal and the tap output. However, the present invention can also be adapted to other types of automatic equalizing circuits. For example, it is applicable to the automatic equalizing circuit of the ZF (zero forcing) type in which tap gain is controlled by both the magnitude of the equalizing error signal and the polarity of the tap output. In this case, the equalizing error signal is quantized to a two-level signal with a positive or negative polarity.

The present invention as exemplified by FIG. 2 may be implemented with conventional analog-type circuit elements in accordance with the block diagram shown therein. Other implementations of the invention are also practical and may have certain advantages. In particular, the use of digital circuit elements with the various mathematical operations being performed by logic circuits is a useful and effective approach. Such an implementation lends itself to large-scale integration with resultant savings in cost, size, weight and power consumption. Accordingly, an alternative embodiment of the digital type will be described hereinbelow. The instant invention has been described as applied to a data communication system using DSBSC modulation. However, as will be evident to those skilled in the art, it is equally applicable to multi-level modulation methods having suppressed carriers. In particular, the digital circuit implementation to be described is directed to a system using quadrature amplitude modulation (QAM).

Before presenting this alternative embodiment of the instant invention, the QAM system will be briefly described with reference to FIG. 4. The diagram illustrates the identification of 8 data points with specific X,Y coordinates. Each of the 8 data points represents a 3-bit (000 to 111) code, and the points are arranged on the circumference of a circle of constant radius such that the projections of each point on the X and Y axes are integers of either "1" or "2." For example, at the point A, the data point represents the code 000 and has a value of "2" on the X axis and a value of "1" on the Y axis.

For transmission of these codes, two independent DSBSC signals in quadrature are used. Each of the suppressed carriers is related to one of the axes. For example, the X axis can correspond to the cos $\omega_c t$ carrier, and the Y axis to the sin $\omega_c t$ carrier. To transmit point A, the cos $\omega_c t$ carrier is subjected to amplitude modulation with the value of "2" and the sin $\omega_c t$ carrier subjected to amplitude modulation with value "1." The two signals are combined, the carriers suppressed and the composite signal transmitted. At the receiving terminal, the received composite signal is synchronously detected with locally-generated cos $\omega_c t$ and sin $\omega_c t$ carriers. Two baseband signals can thus be obtained and the amplitude of each determined to define point A and code 000. As may be understood, the value on the X axis may be considered as the real number, the value on the Y axis as the imaginary number, and the data point, a complex number.

Figure 4:
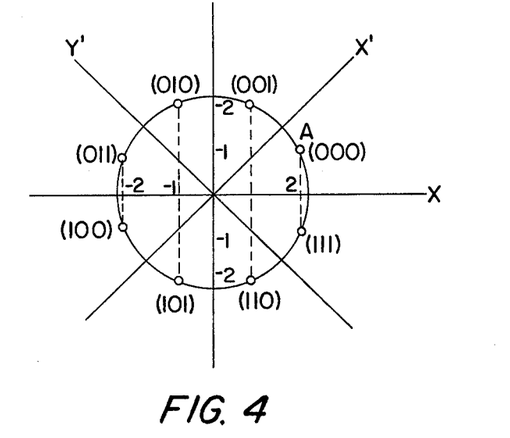
FIG. 4 is a diagram of the coding technique used for transmission of information in a quadrature amplitude modulation (QAM) system that may utilize the present invention.

Also shown in FIG. 4 are X' and Y' axes which can be obtained by rotation of the X and Y axes for 45° in the counterclockwise direction, as is useful for certain purposes described hereinafter.

Figure 3:
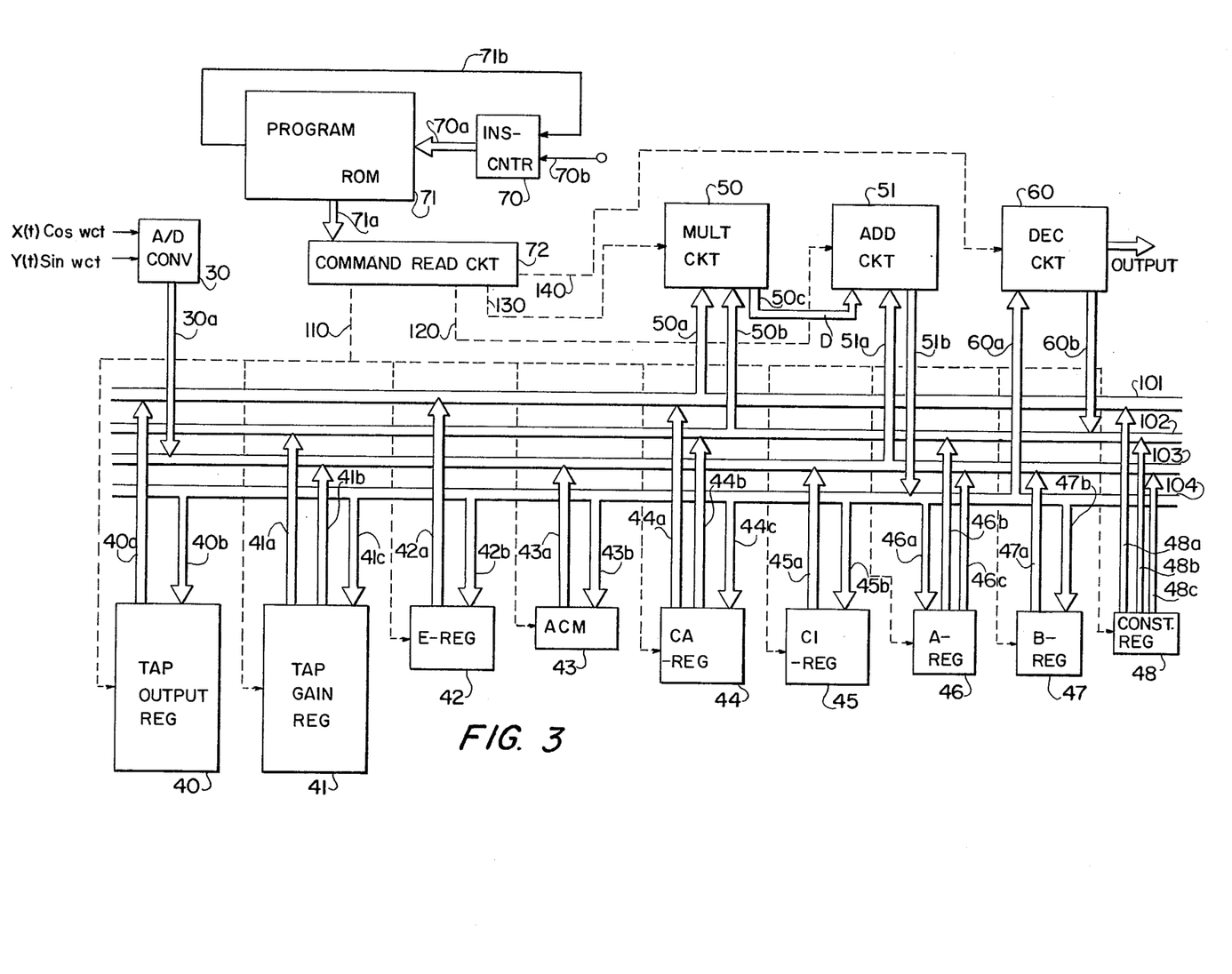
FIG. 3 is a block diagram of another embodiment of the present invention, showing an automatic equalizing circuit realized with digital circuit elements.

FIG. 3 is the block diagram of the instant invention implemented through use of a digital operational processing circuit. The program for operation of the automatic equalizer is stored in the program memory 71 and is controlled by instruction counter 70. Basically, analog-to-digital converter 30 converts the baseband data signals into digital signals which are distributed by data bus 103. The program via command read circuit 72 causes the digital signals to be stored in appropriate registers, drawn out, transferred, and processed (by multiplier 50, adder 51 and decision circuit 40) as required by the equalizer algorithm.

As will be recognized, all of the algorithms and calculations previously described for the analog implementation of the present invention can be performed or approximated by the processing capabilities indicated in the block diagram as will be described in detail hereinbelow. It is assumed that a source of timing, or clock, signals synchronous with the data signal bit rate is available for the program control, sampling, and readout control.

The registers utilized in accordance with the present embodiment are as follows: tap output register 40 which stores the tap output values; tap gain register 41 which stores the gain value for each tap; equalizing error signal register 42 which stores the value of the equalizing error signal; accumulator 43 for storing of intermediate processing signals; constant register 48 for storage of constants required during processing; and a set of intermediate registers designated as CA register 44, CI register 45, A register 46 and B register 47.

Before describing the operation of the invention in performing the automatic equalizer algorithms and calculations, a brief explanation of the processing functions will be given.

Assume that operation of the system is initiated by application of a start signal to instruction counter 70 via input line 70b; the counter output on line 70a then causes program memory 71 to read out the first command of the program stored therein.

The read out program command is received by the command read circuit 72 through line 71a and decoded therein. In accordance with the content of the command, it is given to one of the four command transmission lines 110, 120, 130 and 140. Each time a command is read out from program memory 71, instruction counter 70 is stepped one time via line 71b. As is now evident, programs will be sequentially read out from program memory 71 under the direction of instruction counter 70.

Assume now that data A is present on the first data bus 101, and data B is present on second data bus 102; multiplication circuit 50 receives the data A from line 50a and the data B from line 50b. The multiplication of A × B is performed on command from the command read circuit upon receipt by multiplier 50 of the appropriate command over the dashed line 130. The multiplication result D is sent to adder 51 via line 50c.

Now assume that Data E appears on third data bus 103 and is sent to adder 51 through line 51a; adder 51 then performs either the addition D+E or the subtraction E−D dependent on the command received via dashed line 120 from command read circuit 72. The resultant output is fed to the fourth output data bus 104 by line 51b.

To control the storage and readout of data from the registers, commands from command read circuit 72 are sent over dashed line 110 to the following registers: tap output register 40; tap gain register 41; error register 42; accumulator 43; CA register 44; compensation signal register 45; A register 46; B register 47; and constant register 48. In accordance with the particular command, data will be stored in the designated address or the stored data in the designated address will be output to the desired data bus.

Having described the general operation of the control program and the method of commanding and controlling each element in the present embodiment of the invention, the specific operation in performing the automatic equalization function will be explained by the sequence in which the steps are accomplished.

Step 1: To initially reset the accumulator 43 a constant value "0" is placed on lines 48a, 48b, and 48c by constant register 48 and this "0" is input to multiplier 50 and adder 51 via the data buses 101, 102, 103 and lines 50a, 50b, and 51a. The output line 51b of adder 51 goes to "0" resetting accumulator 43 to "0" by output data bus 104 and line 43b.

Step 2: The analog-to-digital converter 30 receives the two baseband signals from the cos $\omega_c t$ demodulator and the sin $\omega_c t$ demodulator and converts the analog values to the digital values $X_x$ and $Y_y$ respectively. The digital values are sent to the third data bus 103 via line 30a. As above and hereinafter, the signal from the cos $\omega_c t$ demodulator will be identified by the subscript $x$ and the signal from the sin $\omega_c t$ demodulator by the subscript $y$.

The digital values $X_x$ and $Y_y$ appearing on bus 103 are sent to adder 51 by line 51a. At this time a constant value of "0" from constant register 48 is sent to both data buses 101 and 102 via lines 48a and 48b. Therefore, the inputs to multiplier 50 via lines 50a and 50b are both "0" and output of multiplier 50 is "0." Adder 51 thus receives this "0" value via line 50c with the result that the digital values $X_x$ and $Y_y$ are unchanged. These values are supplied via data bus 104 and line 40b to tap output register 40 and are stored, or accumulated, therein. Assuming that the desired number, $n$, of taps is nine ($n=9$), the program will cause nine of such digital values $X_{K_x}$ and $Y_{K_y}$ to accumulate in tap output register 40.

Step 3: The digital values $X_{K_x}$ and $Y_{K_y}$ stored in tap output register 40 are sequentially read out and sent to data bus 101 via line 40a. Simultaneously with the storing of $X_{K_x}$ and $Y_{K_y}$, the tap gain values ($C_{K_x}$ and $C_{K_y}$) are calculated (described in a later step) and stored in tap gain register 41. At this point, previously stored tap gain values are read out and sent to data bus 102 via line 41b. Additionally, the contents of accumulator 43 are sent to data bus 103 via line 43a. The arithmetic operation $X_K \cdot C_K$ now is carried out in multiplier 50 and adder 51. It is to be noted that the arithmetic operation must be performed for complex numbers. For example, in the case of the quadrature amplitude modulation system, cos $\omega t$ is considered a real number and sin $\omega t$ is considered an imaginary number. The above-mentioned operation is carried out under the condition that:

$$X_K = X_{Kx} + iX_{Ky} \text{ and } C_K = C_{Kx} + iC_{Ky}$$

Therefore the operations to be performed are $$X_K C_K = (X_{Kx} + iX_{Ky})(C_{Kx} + iC_{Ky})$$
$$= X_{Kx}C_{Kx} - X_{Ky}C_{Ky} + i(X_{Kx}C_{Ky} + X_{Ky}C_{Kx}) \quad (30)$$

The above described operation is repeated as many times as there are taps and the results added sequentially. As will now be recognized, this step has produced the combined tap output as shown by equation (4).

The role of accumulator 43 in the above calculations is to store certain intermediate real and imaginary products and sums designated as $(A_{cc})_x$ and $(A_{cc})_y$, respectively. The specific procedures will be followed for calculation of equation (30) and the source of these values thereby identified.

The operation $X_{Kx} \cdot C_{Ky}$ is carried out in multiplier 50 and the contents $(A_{cc})_x$ of accumulator 43 are added to the output of multiplier 50 at adder 51. The sum is stored in accumulator 43 via output data bus 104 as a new value for $(A_{cc})_x$. The operation $X_{Ky} \cdot C_{Ky}$ is similarly performed by multiplier 50 and the product subtracted from the stored $(A_{cc})_x$ in adder 51 thereby producing the real term of equation (30). The result of this operation is then stored in accumulator 43 as a new $(A_{cc})_x$ via output data bus 104.

The calculation of the imaginary term of equation (30) involving the sum of $X_{Kx} C_{Ky}$ and $X_{Ky} C_{Kx}$ is similarly performed by multiplier 50 and adder 51 utilizing the imaginary content of accumulator 43, $(A_{cc})_y$. The final imaginary term of equation (30) is stored via bus 104 in accumulator 43 as $(A_{cc})_y$.

The sequence of operations for calculation of equation (30) is repeated as many times as the number of taps (for example, when the number of taps K is 9, the sequence is repeated 9 times), and the real part and imaginary part of the combined tap output is available from accumulator 43 as $(A_{cc})_x$ and $(A_{cc})_y$, respectively. These stored values correspond, of course, to the real and imaginary parts of $y''(t)$ of equation (15).

Step 4: Next, Z (t) is calculated using equation (17), involving operation with complex numbers. Again, accumulator 43 is utilized to separate and store the various real and imaginary parts as the calculation proceeds as (Acc)x and (Acc)y respectively. The operation for Z (t) proceeds accordingly:

$$Z(t) = y''(t) C_{APC}$$
$$= \{(A_{cc})_x + i(A_{cc})_y\} \{C_{APCx} + i C_{APCy}\}$$
$$= (A_{cc})_x C_{APCx} - (A_{cc})_y C_{APCy} + i \{(A_{cc})_y C_{APCx} + (A_{cc})_x C_{APCy}\}$$

To start the above calculation, an initial value for the real part of $C_{APCx}$ is set as "1" and stored in CA register 44 and the imaginary part $C_{APCy}$ is set as "0" and stored in CA register 44. The operation $(Acc)_x C_{APCx}$ is performed by multiplier 50; adder 51 receives the value "0" from the constant register 48 via data bus 103 and generates output $(A_{cc})_x C_{APCx}$, storing this term in the real part storage of A register 46 as $A_x$ via data bus 104.

Next, the operation $(A_{cc})_y C_{APCy}$ is performed by multiplier 50; the subtraction between $A_x$ in A register 46 and the output from multiplier 50 is performed by adder 51 and the result stored as a new value $A_x$ in A register 46.

The operation of $(A_{cc})_y C_{APCx}$ is performed in a similar manner with its result stored in the imaginary part storage of A register 46 as $A_y$. Next, $(A_{cc})_x C_{APCy}$ is similarly calculated by multiplication circuit 50, added to $A_y$ by adder 51 and the result stored in the A register 46 as $A_y$. Thus, $A_x$ and $A_y$ represent the real and imaginary parts, respectively, of Z (t).

Step 5: Having obtained Z (t), the procedure for generating the code output from Z (t) will be explained. As previously described with reference to FIG. 4, eight possible data codes may be transmitted with the codes corresponding to eight data points arranged on the circumference of a circle so that the projections of each point onto the X and Y axes have values of either "1" or "2."

Also, it was indicated that the X and Y axes could be rotated 45° counterclockwise to produce axes X' and Y'. Assuming such axis rotation, it will be understood that each of the data points lies between adjacent axes. For example, point A (000) in FIG. 4 lies between positive axis X and positive axis X'.

To determine the code point corresponding to a received signal Z (t), the adjacent axes between which the vector Z (t) (indicated by real part $A_x$ and imaginary part $A_y$) lies can be found. This operation can be performed by determining if $A_x$ is positive or negative about the X axis; if $A_y$ is positive or negative about the Y axis; and if the vector Z (t) is positive or negative about the X' axis and Y' axis. Accordingly, $A_x$ and $A_y$ stored in A register 46 can be checked for polarity, and the coordinates of vector Z(t) rotated and the converted value checked for its polarity — i.e., whether positive or negative.

The rotation and polarity determination is performed by obtaining the value $A_x \cos 45° + A_y \sin 45°$, and the value $(A_x \cos 135° + A_y \sin 135°)$. These terms will be referred to hereinafter as $(A_x + A_y)$ and $(A_x - A_y)$, respectively, to simplify the notation.

Figure 5:
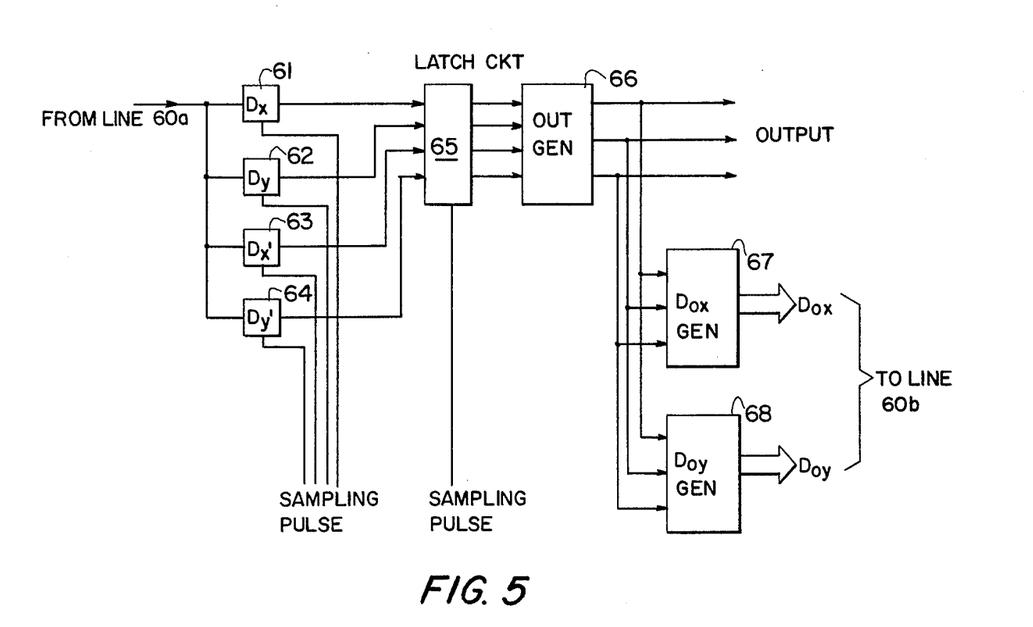
FIG. 5 is a detailed block diagram of the decision circuit shown in FIG. 3 suitable for use in the QAM system referred to by FIG. 4.

The required calculations are performed by decision circuit 60, and FIG. 5 shows a block diagram of this element of the present embodiment. In this figure, 61 represents the $D_x$ register; 62, $D_y$ register; 63, $D_{x'}$ register; 64, $D_{y'}$ register; 65, LATCH circuit; 66, code output generator; and 67, 68, $D_{OX}$ output generator and $D_{OY}$ output generator, respectively.

First, to store the positive or negative code bit $A_x$ from A register 46 in $D_x$ register 61 of decision circuit 60, a constant "0" is sent to the data bus 101 and to the data bus 102 from constant register 48. Multiplier 50 performs the operation of "0 × 0"; adder 51, receiving the results of the operation via line 50c, performs the addition between this operation result and $A_x$ of A register 46, supplied via bus 103, and stores the new $A_x$ in register 46 via output data bus 104.

The positive or negative code bit $A_x$ is next stored in $D_x$ register 61 of decision circuit 60, via line 60a. Similarly, the positive or negative code bit $A_y$ of A register 46 is stored in the $D_y$ register 62 of decision circuit 60.

To obtain the positive or negative code bits for the $D_{x'}$ and $D_{y'}$ values, constant register 48 sends a "1" to data bus 101 and A register 46 sends the $A_y$ value to data bus 102. Multiplier 50 carries out the multiplication of "1 × $A_y$", while adder 51 performs the addition of this multiplication result and $A_x$ from A register 46, sending the output "$A_x + A_y$" to output data bus 104, and this sum stored in $D_{x'}$ register 63. In a similar fashion, adder 51 carries out the subtraction between $A_x$ and $A_y$, sends the "$A_x - A_y$" to the output data bus 104 and stores the positive/negative code of "$A_x - A_y$" in the $D_{y'}$ register 64 of decision circuit 60. After the positive and negative code bits are stored in D-registers 61, 62, 63, 64, each bit output is sent to code output generator 66 sequentially by means of latch circuit 65. The code output generator 66 includes a ROM (read-only memory) and will output any one of the eight codes shown in FIG. 4 according to the polarity sequence of the four output bits from latch circuit 65. Thus, the decision circuit 60 outputs the code group as required for that data symbol duration. This output code also inputs to $D_{ox}$ output generator 67 and $D_{oy}$ output generator 68 which generate the values $D_{ox}$ on the X axis and $D_{oy}$ on the Y axis, respectively.

For example, if the output code group is "000," the digital output of $D_{ox}$ will represent a "2" and of $D_{oy}$ will represent a "1." The $D_{ox}$ and $D_{oy}$ values are sent to data bus 102 of FIG. 3.

Step 6: It is now required to generate the error signal $E(t)$ as expressed by equation (18). Consequently, the difference $(A_x - D_{ox})$ is calculated and stored as $E_x$ in E register 42, and the difference $(A_y - D_{oy})$ calculated and stored as $E_y$ in E register 42, using the subtraction algorithm previously described. In other words, the multiplication circuit 50 performs the multiplication of a constant "1" of the constant value register 48 given via the first data bus 101 and the value $D_{OX}$ on the above-mentioned second data bus 102 and the adder 51 carries out the subtraction between $A_x$ of the A register 46 given via the third data bus 103 and the multiplication result $D_{OX}$. Thus, the output $(A_x - D_{OX})$ is stored as the $E_x$ in the error signal register 42. In the same way, $(A_y - D_{OY})$ is stored as the $E_y$ in the error signal register 42.

Step 7: Next, $H(t)$ of equation (26) is obtained utilizing the following relation:

$$H(t) = E(t) C^*_{APC}(t)$$

$$= (E_x + E_y)(C_{APCx} - C_{APCy})$$

$H(t)$ can be transformed as follows:

$$H(t) = E_x C_{APCx} + E_y C_{APCy} + i(E_y C_{APCx} - E_x C_{APCy})$$

The calculation is performed using the same technique for obtaining $Z(t)$ as described in step 4 above. Namely, the multiplication circuit 50 performs the multiplication of $E_x$ and $C_{APCx}$, while the adder 51 carries out the addition of multiplication result and a constant "0." Thereby, the result is stored in the A register as the $A_x$ of the A register 46. Then the multiplication circuit 50 performs the multiplication of $E_y$ and $C_{APCy}$, while the adder 51 carries out the addition of $A_x$ stored and the multiplication result. Thereby, the result is stored in the A register as $A_x$ and, specifically, the real part of $H(t)$ is stored in A register 46 as $A_x$. In a similar way, the operation is performed for the imaginary part $A_y$ and the imaginary part is stored in A register 46 as $A_y$. Thereby $A_y = E_y'C_{APCx} - E_x'C_{APCy}$ can be obtained.

Step 8: Compensation of the tap gain values is carried out using the value of $H(t)$ computed in step 7 above. For purposes of the computation, $C_K$ is expressed as:

$$C_K^{(n+1)} = C_K^{(n)} + X_K H^*(t)$$

$$= C_{Kx} + iC_{Ky} + (X_{Kx} + iX_{Ky})(A_x - iA_y)$$

$$= C_{Kx} + X_{Kx}A_x + X_{Ky}A_y + i(C_{Ky} + X_{Ky}A_x - X_{Kx}A_y)$$

This operation can be performed using the same technique as described in step 3 above. That is, the multiplier 50 performs the multiplication of $X_{kx}$ of tap output register 40 and $A_x$ of A register 46. Next, adder 51 performs the addition of $C_{kx}$ of the tap gain register 41 and the result of the multiplication. The result is stored in the tap gain register 41 as $C_{Kx}$. The calculation of $C_{Ky}$ is made in the same manner as $C_{Kx}$. The above operations are repeated as many times as the number of taps K and thus the gain values $C_{Kx}$ and $C_{Ky}$ for each tap can be optimized.

Step 9: Next $E_a(t)$ is computed in accordance with equation (19) which can be expressed by $$E_a(t) = E(t)a^*(\tau, T)$$

$$= (E_x + iE_y)(D_{ox} - iD_{oy})$$

$$= (E_x D_{ox} + E_y D_{oy}) + i(E_y D_{ox} - E_x D_{oy}).$$

This operation is performed using the same technique as described in step 4 above. Decision circuit 60 sends $D_{ox}$ and $D_{oy}$ to the data bus 102, error signal register 42 sends $E_x$ and $E_y$ to the data bus 101, and the A register 46 sends $A_x$ and $A_y$ to the data bus 103, and the operation is carried out by the multiplier 50 and adder 51.

In other words, multiplier circuit 50 performs the operation of $E_x \cdot D_{ox}$, and stores the results in the A register 46 as $A_x$. Next, the multiplier circuit 50 carries out the operation of $E_y \cdot D_{oy}$, while the adder 51 performs the addition of stored $A_x$ and the multiplication result and stores the result in the A register as a new value of $A_x$. The operation is similarly performed for the imaginary part and the result is store in the A register 46 as $A_y$.

Step 10: Following equation (20), $E_b(t)$ is next calculated. For the computation of $b \int E_a(t)dt$, (the second term of Equation 20), an approximation of the integration is made by multiplication of the integral coefficient $b$ and $E_a(t)$ (from $A_x$ and $A_y$) using coefficient $b$ from constant value register 48 and $A_x$ from A register 46. The adder 51 adds $C_{ix}$ of the CI register 45 to the result of the above multiplication. The result of this addition is then stored in the CI register 45 as a new value for $C_{ix}$. Initially, the value "1" is stored in CI register 45 as $C_{ix}$ and $C_{iy}$—i.e., $C_{ix} = C_{iy} = $ "1" is input as the initial value into the CI register 45.

The same operations are carried out for the imaginary part and $C_{iy} + bA_y$ is stored as $C_{iy}$. Next, the constant $a$ is multiplied with $A_x$ and the product added to $C_{ix}$ and the result stored in A register 46 as a new $A_x$, and the result of multiplication of constant $a$ and $A_y$ is added to $C_{iy}$ and stored in A register 46 as $A_y$. Thus, the real and imaginary parts of $E_b(t)$ are available as $A_x$ and $A_y$, respectively.

Step 11: $C_{APC}$ is now obtained using equation (21). Accordingly, $C_{APC} \cdot E_b(t)$ is obtained first. Denoting $C_{APC} E_b(t)$ as $E_c(t)$, it can be expressed as $$E_c(t) = (C_{APCx} + iC_{APCy})(A_x + iA_y)$$

$$= A_x C_{APCx} - A_y C_{APCy} + i(A_x C_{APCy} + A_y C_{APCx})$$

This computation can be performed using the same technique as described in step 4 above, and the result stored in B register 47 as $B_x$ and $B_y$.

Namely, $C_{APCx}$, $C_{APCy}$ of the CA register are sent to the first data bus 101, $A_x$, $A_y$ of the A register 46 of the second data bus. Then, the operation result of the multiplication circuit 50 and the adder 51 is stored in the B register 47.

For example, the multiplication circuit performs the operation of $C_{APXx} \cdot A_x$ and stores the operation result in the B register as $B_x$ via the adder 51. Then, the multiplication circuit carries out the multiplication of $C_{APCy} \cdot A_y$ and the adder 51 carries out the subtraction between this multiplication result. The result is stored as $B_x$. The operation for $B_y$ (that is, the imaginary part) can be made in the same manner. Then, $C_{APC}$ is obtained by using $B_x$ and $B_y$. The integration, $C_{APC} \int E_c(t) \, dt$ can now be performed using an approximate calculation with the integral coefficient of "1." In other words, the computations $$C_{APCx} = C_{APCx} + B_x \text{ (i.e., in each successive cycle)}$$
$$C_{APCy} = C_{APCy} + B_y \text{ (i.e., in each successive cycle)}$$

are performed with $C_{APC}$ obtained. This operation is, of course, accomplished by multiplier 50 performing multiplication of $C_{APCx}$ from CA register 44 and a constant "1" from constant register 48 with adder 51 adding $B_x$ from B register 47 to the multiplication result. The result is then stored in CA register 44 as a new value of $C_{APCx}$. $C_{APCy}$ is also obtained in the same manner, generating a new $C_{APCy}$ in CA register 44. The values of $C_{APCx}$ and $C_{APCy}$ are then used for compensation of $X_x$ and $X_y$ for the next cycle of step 4.

As has now been shown, the digital processing implementation of the present invention can compensate for the effect of phase jitter present on the locally-generated carrier without decreasing or significantly affecting the compensating accuracy of the equalizer with respect to the steady state channel characteristics.

An analog circuit implementation and a digital implementation of the automatic equalizer have been described hereinabove. However, it will be apparent to those skilled in the art that various other implementations and configurations can be made, following these teachings, and such implementations are to be considered within the scope of the present invention.

What is claimed is:

1. Apparatus for use at the receiving terminal of a suppressed carrier data communications system, receiving transmitted data signals over a transmission channel, for automatically compensating for static transmission channel characteristics, and for dynamic variations in the amplitude and phase characteristics of the locally-generated carrier frequency, comprising:
   a transversal filter having an input for receiving distorted data signals from the transmission channel, said transversal filter having a controllable transfer function, and an output for data signals as modified by said transfer function;
   dynamic compensating means operatively connected to said output of said filter for correcting distortion of the modified data signals caused by the dynamic variations in the amplitude and phase characteristics of the locally-generated carrier, said dynamic compensating means having controllable compensating characteristics and having an output for providing distortion corrected data signals;
   decision means having an input and an output, with said input connected to the output of said dynamic compensating means, said decision means responding to the distortion corrected data signals from said dynamic compensating means for producing a digital output representation of the transmitted data signals at said output thereof;
   error signal generating means connected to said input and said output of said decision means for producing an error signal proportional to the difference between the signals appearing at said input and said output of said decision means;
   processing means connected to said decision means and to said error signal generating means, and responsive to said output of said decision means and to said error signal for processing the error signal to produce a first control signal representative of only the data signal distortion due to the static transmission channel characteristics, and a second control signal representative of only the data signal distortion due to the dynamic locally-generated carrier characteristics;
   first control means operatively connected to said transversal filter, to said processing means, and to said error signal generating means, and responsive to the first control signal and to said error signal for varying said controllable transfer function of said filter to minimize the error signal, thereby substantially correcting the distortion of the data signals due to the static characteristics of the transmission channel, and
   second control means operatively connected to said dynamic compensating means and to said processing means, and responsive to the second control signal for varying said controllable compensation characteristics of said dynamic compensating means to minimize the error signal, thereby substantially correcting the distortion of the data signals due to the dynamic variations in the characteristics of the locally-generated carrier.

2. The apparatus as recited in claim 1 in which said processing means includes:
   second order integrator means for receiving the error signal from said error signal generating means and the digital output of said decision means and producing the second control signal; and
   first multiplying means for receiving the error signal from said error signal generating means and the second control signal from said second order integrator means and multiplying same for producing the first control signal.

3. The apparatus as recited in claim 2 in which said dynamic compensating means includes second multiplying means for producing the product of the modified data signals and the second control signal.

4. The apparatus as recited in claim 2 in which said second order integrator means has a transfer function of the form $(a + b/s)1/s$.

5. The apparatus as recited in claim 1 in which said error signal generating means includes a subtraction circuit for producting the error signal.

6. The apparatus as recited in claim 1 in which said dynamic compensating means has a speed of response selected to allow tracking of the phase jitter of the locally-generated carrier independently of the accuracy of said transversal filter compensation characteristic.

7. The apparatus as recited in claim 1 in which said transversal filter includes:
   a delay line tapped at intervals providing delays equal to the time duration of a data symbol of the data signals;
   a tap gain circuit connected to each of the taps of said delay line;
   a tap gain control circuit operatively connected to each of said tap gain circuits, and responsive to the first control signal; and
   summing means connected to each of said tap gain circuits for summing the outputs of said tap gain circuits to produce the modified data signals.

8. The apparatus as recited in claim 7 in which said first control means comprises:
   multiplying means operatively connected to each tap circuit of said delay line for multiplying the first control signal and the tap output signal; and
   averaging means connected to output of said multiplying means for averaging the output signal of said multiplying means, the output of said averaging means being connected to said tap gain control circuit for control thereof.

9. The apparatus as recited in claim 7 having a number of taps of said delay line selected to provide a predetermined accuracy of compensation for distortion due to the static transmission channel characteristics independently of distortion due to dynamic variations of the locally-generated carrier.

10. In a transmission system comprising a receiver having a decision circuit for making a decision as to the identity of received digital signals, an apparatus for automatically correcting both a steady state portion of distortion in digital signals due to static characteristics of the transmission system and a dynamic portion of distortion in digital signals due to dynamic characteristics of the transmission system carrying such signals, comprising;

means for producing an error signal substantially proportional to the distortion of the digital signals;

error signal processing means for receiving the error signal from said producing means, and responsive thereto and to said decision from said decision circuit for resolving the error signal into a first component substantially proportional to said steady state portion of the distortion due to the static characteristics of the system, and a second component substantially proportional to said dynamic portion of the distortion due to the dynamic characteristics of the system;

first adjustable compensating means for modifying the distorted digital signals, said first adjustable compensating means receiving and being adjustable in response to the first component of the error signal and to said error signal for minimizing the first component of the error signal, and thereby correcting for the static distortion; and second adjustable compensating means for modifying the distorted digital signals, said second adjustable compensating means receiving and being adjustable in response to the second component of the error signal and to said error signal for minimizing the second omponent of the error signal, and thereby correcting for the dynamic distortion.

11. The apparatus as recited in claim 10 further comprising:

digital processing means for processing the distorted digital signals; and program storage means operatively connected with said digital processing means and having a predetermined digital program stored therein for controlling said digital processing means to operate in a predetermined sequence to process the distorted digital signals whereby the functions of said error signal producing means, said error signal processing means, said first adjustable compensating means, and said second adjustable compensating means are performed by said digital processing means in response to said digital program.

12. Apparatus for automatically correcting distortion including both static distortion due to static transmission channel characteristics and dynamic distortion of baseband digital data signals due to variations of amplitude and phase characteristics of the system carrying such signals comprising:

digital processing means for processing said baseband digital data signals; and program storage means controllably connected with said digital processing means and having a preselected sequential digital program stored therein for controlling said digital processing means so as to cause said digital processing means to convert the baseband digital data signals to digital codes including said static and dynamic distortion, to generate a code output determined by amplitude and phase values of each successive data period represented by the digital codes, to measure the difference between the code output and the corresponding digital code to develop an error signal, to process said error signal to further develop a first error value indicating said static distortion due to static transmission channel characteristics and a second error value indicating said dynamic distortion due to variations of the amplitude and phase characteristics, and to use said first and second error values to modify the digital code to minimize said first and second error values, respectively, thereby correcting the static distortion and the dynamic distortion, respectively, of the data signals.

13. The apparatus as recited in claim 12 in which said sequential digital program causes said digital processing means to separate the error signal developed from said measured difference into said first error value indicating the static amplitude and phase characteristics of the system and a second error value indicating the dynamic amplitude and phase characteristics of the system, to cause the first component to modify the digital code to minimize distortion due to such static characteristics, and to cause the second component to modify the digital code to minimize said dynamic distortion due to such dynamic characteristics.

14. The apparatus as recited in claim 12 in which said digital processing means includes a digital decision circuit, said circuit generating the code output under control of said digital program with each such code output consisting of a 3 bit code in response to a quadrature amplitude modulation data signal represented by a complex vector, said digital decision circuit including:

a first digital register for storing a digital representation of the polarity of the X-axis component of the vector;

a second digital register for storing a digital representation of the polarity of the Y-axis component of the vector;

a third digital register for storing a digital representation of the polarity of the X'-axis component of the vector where said X'-axis represents the X-axis rotated 45° counterclockwise;

a fourth digital register for storing a digital representation of the polarity of the Y'-axis component of the vector where said Y'-axis represents the Y-axis rotated 45° counterclockwise;

a latch circuit for reading out each of the digital polarity representations of said first through said fourth registers sequentially; and an output code generator for sequentially receiving during one data period the digital polarity representations of one of eight complex vectors from said latch circuit and for generating the 3-bit code output uniquely determined by the sequence of polarities of the digital polarity representations.

15. A method for automatically correcting static and dynamic distortion of digital data signals having a selected data symbol duration, comprising the steps of:

passing the signals through a transversal filter having a plurality of adjustable tap gain circuits;

passing the signals from the transversal filter through an adjustable network for correcting data signal distortion due to variations of the channel;

performing a decision operation on the signals from the adjustable network to generate an output code group for each data symbol duration period;

comparing each output code group with the signals from the adjustable network to generate an error signal;

processing the error signal so as to separate same into a first component representing needed adjustment of the tap gain circuits to compensate for static distortion of the digital data signals and a second component representing needed adjustment of said adjustable network to compensate for dynamic distortion of the digital data signals;

adjusting the adjustable tap gain circuits in accordance with the first component to minimize the value of the first component; and adjusting the adjustable network in accordance with the second component to minimize the value of the second component.

16. A method for automatically correcting static and dynamic distortion of digital data signals having a selected data symbol duration, comprising the steps of:

converting a baseband data signal occurring in a data symbol duration period to a digital code value;

storing a selected number of such digital code values in a tap register;

modifying the value of each of the selected number of stored digital code values according to the value of corresponding digital coefficients stored in a tap gain register;

combining the modified stored digital code values to produce a first compensated coded value;

modifying the first compensated coded value in accordance with a digital coefficient stored in a CA register to produce a second compensated coded value;

storing the second compensated coded value in an A register;

judging the second compensated coded value from the A register to determine an output digital code group denoted by such second compensated coded value;

generating the digital code group so determined;

comparing the output digital code group with the second compensated coded value stored in the A register to generate a first error signal representing needed adjustment of the digital coefficients stored in the tap gain register to compensate for static distortion of the digital data signals and a second error signal representing needed adjustment of the digital coefficients stored in the CA register to compensate for dynamic distortion of the digital data signals;

adjusting the digital coefficients stored in the tap gain register in accordance with the first error signal in a manner to minimize succeeding values of the first error signal;

adjusting the digital coefficients stored in the CA register in accordance with the second error signal in a manner to minimize succeeding values of the second error signal; and repeating each of such steps for each successive baseband data signal occurring in each data symbol duration period.

17. The method described in claim 16 which includes the further step of controlling each of such steps by means of a digital program stored in a digital program storage element.

18. The method described in claim 16 in which the baseband data signal is composed of two signal components in quadrature phase relationship and in which said judging step includes the further steps of:

resolving the second compensated coded value from the A register into four polarity indicating components; and determining the polarity sequence of the polarity-indicating components to determine a 3-bit code group represented by such sequence.

19. Apparatus for automatically correcting static and dynamic distortion of digital data signals having a selected data symbol duration, comprising:

digital multiplier means for producing products of digital coded values;

digital adder means for producing sums and differences of digital coded values;

analog-to-digital converter means for receiving baseband digital data signals and generating a digital coded value for each signal occurring in a data symbol period;

tap register means for storing a selected number of the same digital coded value;

tap gain register means for storing a set of tap gain digital coefficients equal in number to said selected number, said multiplier means multiplying each of such stored coded values by a corresponding one of such tap gain coefficients, said digital adder means producing the sum of such multiplied digital coded values, such sum representing a first compensated coded value;

sum-signal register means for storing said first compensated coded value;

sum-signal coefficient register means for storing sum signal coefficients, said multiplier means multiplying said first compensated coded value by said sum-signal coefficient to produce a second compensated coded value;

digital decision means for receiving said second compensated coded value and generating an output digital code group representing a best estimate of the transmitted digital code group, said multiplier and said adding means performing computations on the code output and second compensated coded value to produce a first error signal representing needed adjustment of the tap gain register means to compensate for static distortion of the digital data signals and a second error signal representing needed adjustment of said tap gain register means to compensate for dynamic distortion of the digital data signals;

means for performing computations on the first error signal and the set of tap gain coefficients thereby to change the values of the coefficients in a manner to minimize the value of the first error signal, and performing computations between the second error signal and the sum-signal coefficient thereby to change the value of said coefficients to minimize the value of the second error signal; and program storage means having a plurality of control buses and signal buses interconnecting said multiplier means, said adder means, said converter means, said tap register means, said tap gain register means, said sum-signal register means, said sum-signal coefficient register means, and said decision means, said program storage means having a digital program stored therein for sequentially controlling each of said interconnected means to minimize the first and second error signals whereby the distortion of the digital data signal is substantially corrected.

* * * * *